United States Patent [19]

Kitazawa et al.

[11] Patent Number: 5,070,431
[45] Date of Patent: Dec. 3, 1991

[54] DISPLAY BOARD ILLUMINATING DEVICE FOR PASSIVE DISPLAYS

[75] Inventors: Hideki Kitazawa; Ryohei Terada; Shogo Takeuchi; Tsutomu Kayama; Kohichi Tanimoto; Nobuo Utsugi; Yoshiaki Nagai, all of Kawagoe, Japan

[73] Assignee: Pioneer Electronic Corporation, Tokyo, Japan

[21] Appl. No.: 559,358

[22] Filed: Jul. 30, 1990

[30] Foreign Application Priority Data

Aug. 3, 1989 [JP] Japan ................... 1-202560

[51] Int. Cl.$^5$ .............................. F21V 13/00
[52] U.S. Cl. ....................... 362/31; 362/26; 362/27; 362/30; 362/800
[58] Field of Search ............. 362/24, 26, 29, 30, 362/31, 800, 249, 252, 27

[56] References Cited

U.S. PATENT DOCUMENTS

| | | | |
|---|---|---|---|
| 2,712,593 | 7/1955 | Merchant | 362/27 |
| 3,561,145 | 2/1971 | Shotwell | 362/26 |
| 4,257,084 | 3/1981 | Reynolds | 362/31 |
| 4,258,643 | 3/1981 | Ishikawa | 362/26 |
| 4,453,220 | 6/1984 | Trcka et al. | 362/29 |
| 4,630,895 | 12/1986 | Abdala, Jr. et al. | 362/31 |
| 4,874,228 | 10/1989 | Aho et al. | 362/26 |
| 4,890,201 | 12/1989 | Toft | 362/31 |
| 4,903,171 | 2/1990 | Livezey et al. | 362/26 |
| 4,929,062 | 5/1990 | Guzik et al. | 362/31 |
| 4,933,814 | 6/1990 | Sanai | 362/26 |

FOREIGN PATENT DOCUMENTS 952388  3/1964  United Kingdom ................. 362/31

Primary Examiner—Ira S. Lazarus
Assistant Examiner—Y. Quach
Attorney, Agent, or Firm—Perman & Green

[57] ABSTRACT

A display board illuminating device includes a light guide plate arranged to face the back of a display board and a light source disposed to face the side end of the light guide plate. The side end of the light guide plate is inclined toward the center of the light guide plate in the direction of the display board. By this configuration an angle of an optical axis refracted at the surface of the side end and incident into the light guide plate with respect to a main surface of the light guide plate, so that the whole area of the display board is illuminated efficiently.

10 Claims, 10 Drawing Sheets

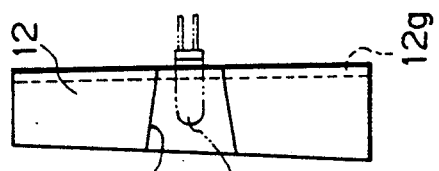
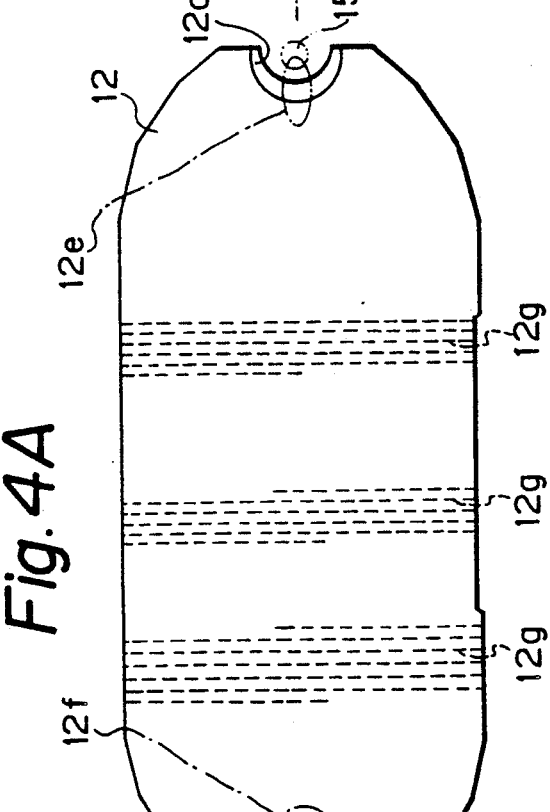
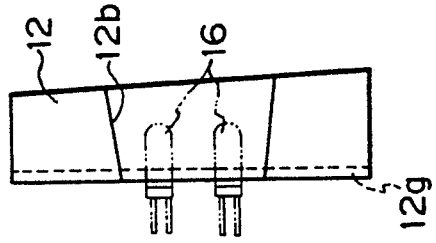
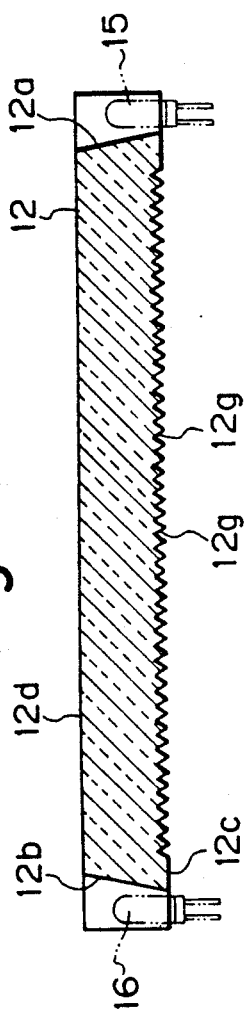

DISPLAY BOARD ILLUMINATING DEVICE FOR PASSIVE DISPLAYS

BACKGROUND OF THE INVENTION

1. Field of the Invention

The present invention relates to a display board illuminating device for a display unit including a display board, such as a dial scale of a tuner or a dial plate.

2. Description of Background Information

FIG. 1 shows an example of conventional devices for illuminating a display board. As shown, this conventional device includes a light guide plate 2 placed to face the back of an elongated rectangular display board 1 and a light emitting element 3, functioning as a light source, disposed to face an end surface of the light guide plate 2 at one side in the longitudinal direction of the light guide plate 2. The back surface 2a of the light guide plate 2 is formed into a rough surface or covered with a white printing material in order to diffuse the light.

In the illuminating device having the construction described above, the light emitted from the light emitting element 3 enters the light guide plate 2, and guided to a predetermined area of the back surface of the display board 1, while being reflected and diffused within the light guide plate 2.

In the case of the conventional illuminating device as described above, there was a problem that the light from the light emitting element 3 does not reach sufficiently to the opposite end of the display board especially when the size of the display board in the longitudinal direction is large, thereby making it difficult to illuminate the whole area of the display board 1 at a uniform illumination level. Furthermore, the light issued from the light emitting element 3 is not efficiently introduced to the back surface of the display board 1, causing a problem that the illuminating light is dissipated wastefully.

OBJECT AND SUMMARY OF THE INVENTION

The present invention is based on the recognition of the above-mentioned problem, and an object of the present invention is to provide a display board illuminating device by which the whole area of the display board is illuminated at a uniform illumination level, and the light is utilized at high efficiency.

A display board illuminating device according to the present invention includes a light guide plate placed to face the back surface of a display board to be illuminated and a light source arranged to face a side end surface of the light guide plate crossing a longitudinal axis of the light guide plate. The side end surface of the light guide plate is inclined toward the center of the light guide plate in the direction of the display board.

By the structure described above, an optical axis of the light incident into the light guide plate, which is diffracted at the side end surface, with respect to the main surface of the light guide plate is made small.

BRIEF DESCRIPTION OF THE DRAWINGS

FIGS. 4A through 4C are front, left side, and right side views of the light guide plate included in the display board illuminating device shown in FIG. 2;

FIG. 4D is a sectional view taken along a line IVd—IVd of FIG. 4A;

DETAILED DESCRIPTION OF PREFERRED EMBODIMENTS

The preferred embodiments of the present invention will be described with reference to FIGS. 2 through of the accompanying drawings.

FIGS. 2 through 5 show a display board illuminating device as the first embodiment of the present invention.

Figure 1:
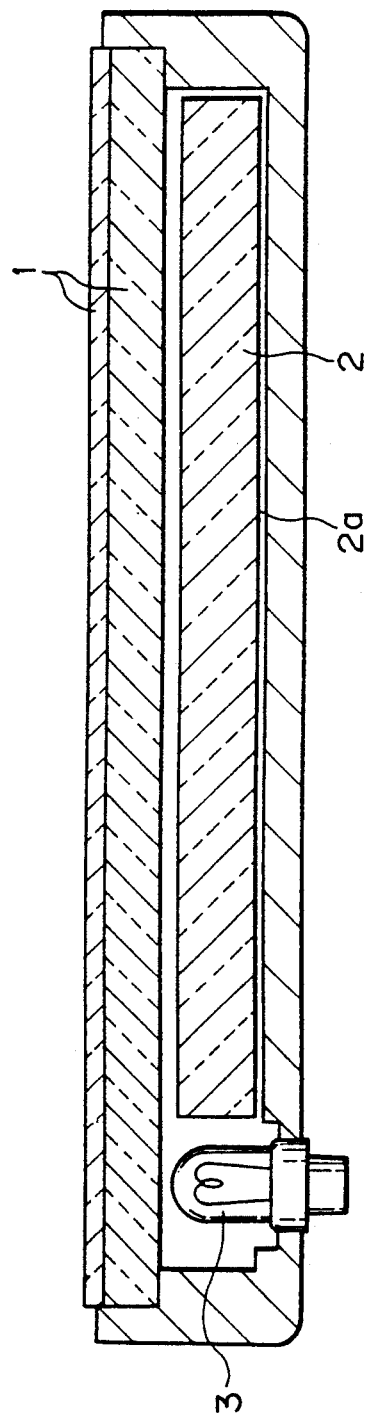
FIG. 1 is a longitudinal sectional view of a conventional display board illuminating device.
Figure 2:
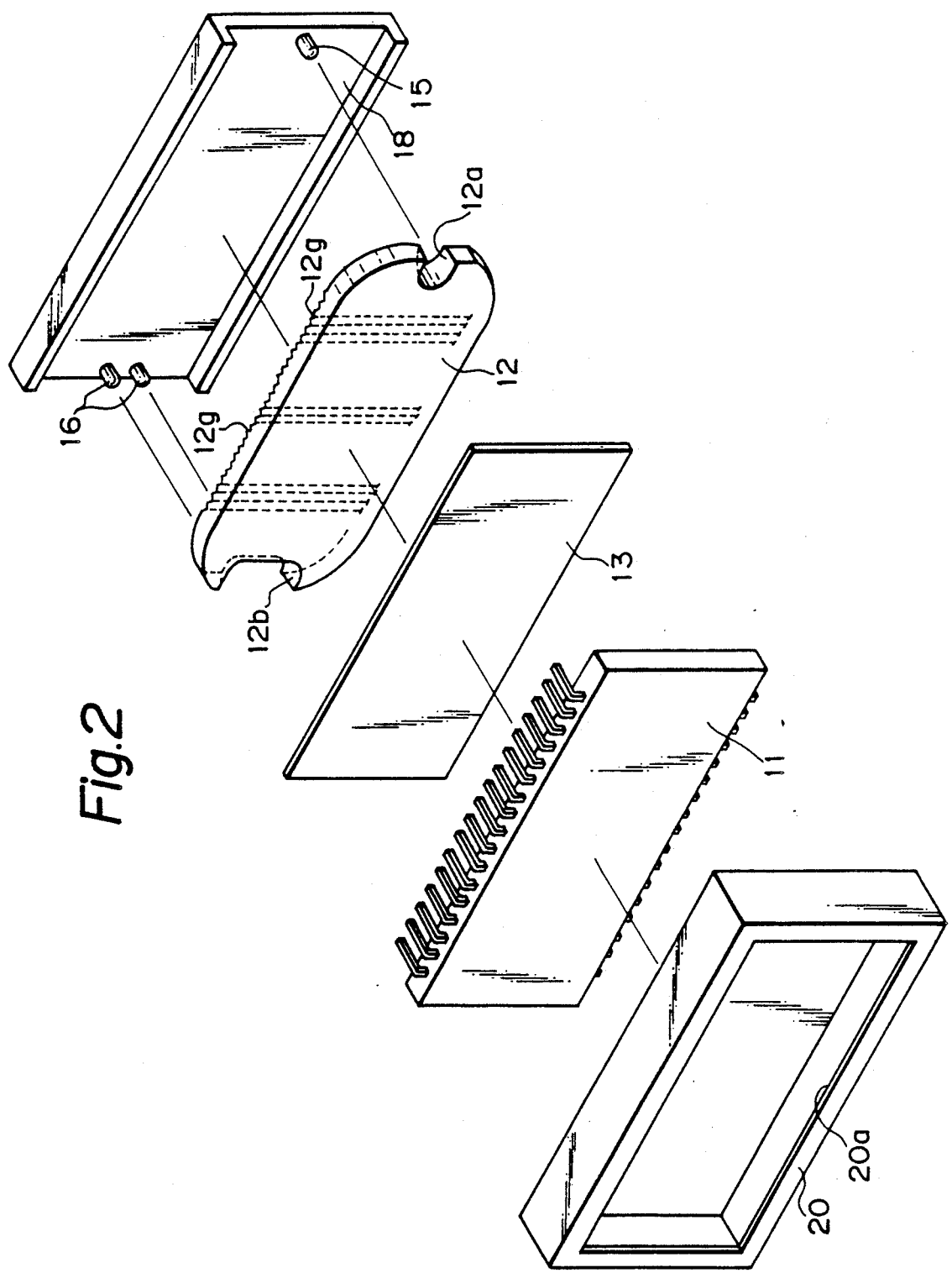
FIGS. 2 and 3 are exploded and longitudinal sectional views respectively, of a display unit including a display board illuminating device as a first embodiment of the present invention and a display board to be illuminated by the illuminating device.
Figure 3:
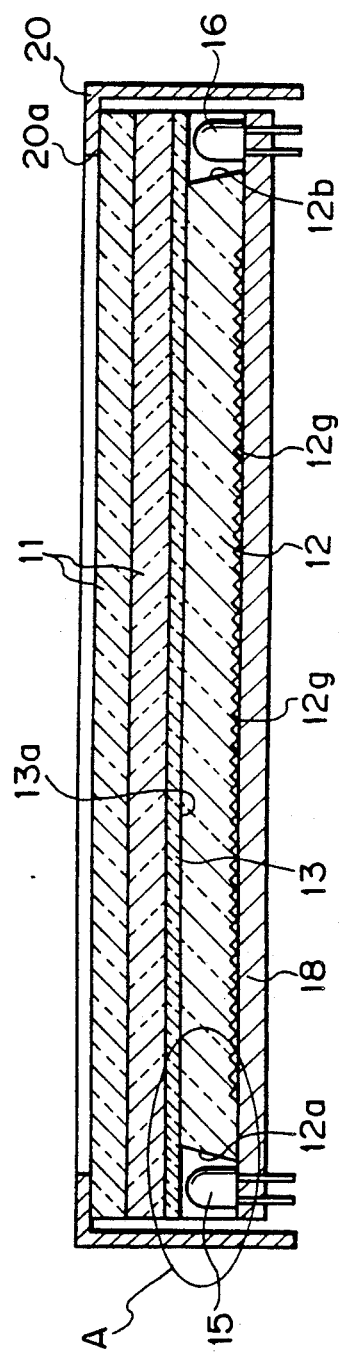

As shown in FIGS. 2 and 3, the display board illuminating device includes a light guide plate 12 which is placed to face the back surface of an LCD (liquid-crystal display) having a rectangular tabular shape, provided as a display board to be illuminated. The device further includes a diffusion plate 13 of rectangular tabular shape, inserted between the LCD 11 and the light guide plate 12. As indicated also in FIGS. 4A through 4D, the light guide plate 12 is formed so that its main surface as a whole has a roughly elliptic shape.

Light emitting elements 15 and 16 functioning as light source are provided to respectively face left and right end surfaces of the light guide plate 2, the end surfaces lying transverse to a longitudinal axis of the light guide plate 2. The light emitting elements 15 and 16 are mounted on a fitting plate made of a region and having a rectangular tabular shape, placed on the rear side of the light guide plate 12.

The above-described LCD 11, light guide plate 12, diffusion plate 13, and the fitting plate 18 are stacked with each other and housed in a frame member 20 which is formed into a rectangular parallelepiped. The frame member 20 is provided with an opening 20a of a rectangular shape for viewing the display surface of the LCD 11.

The light guide plate 12 is made of a transparent synthetic resin such as an acrylic resin or a glass, and directs and diffuses the light emitted from the light emitting elements 15 and 16 to a predetermined area or the whole area of the back surface of the LCD 11, while reflecting the light in the interior thereof. In this embodiment, the color of the light emitting element 15 is different form the color of the light emitting element 16, so that the light guide plate 12 may diffuse the lights of different two colors respectively into arbitrarily determined areas. In addition, instead of providing a plurality of light emitting elements having different colors of the emitted light as in the case of this embodiment, the device may be arranged to include only a single light emitting element facing one of the left and right side end surfaces of the light guide plate 12. In such a case, the light emitted from the single light emitting element is effectively guided to the end surface of the other side of the light guide plate 12 while maintaining a uniform illumination level, by a function which will be described later.

As described above, the material of the light guide plate 12 is transparent. The diffusion plate 13 inserted between the light guide plate 12 and the LCD 11 is also made of a transparent acrylic resin, for example. The diffusion plate 13 performs the function of further diffusing the light from the light emitting elements 15 and 16 guided to the whole area of the light guide plate 12. The back surface 13a of the diffusion plate 13 is formed into a rough surface and coated with a white paint, so that the light is randomly scattered by the reflective surface inside the diffusion plate 13. The left and right side faces of the light guide plate 12 are provided with recesses 12a and 12b extending from the front surface to the back surface of the light guide plate 12. The light emitting elements 15 and 16 are received in the recesses 12a and 12b respectively. By the configuration in which recesses are formed on the side ends of the light guide plate and the light emitting elements are positioned in the recesses, the lights generated by the light emitting elements 15 and 16 enter efficiently into the light guide plate 12, so that a high efficiency in the utilization of light is attained. As shown in FIG. 4A especially, the surfaces within the recesses 12a and 12b (inner surfaces) are curved with respect to a plane parallel to the back surface of the light guide plate 12a, and the cross section of the recess 12a in this plane has an almost semicircular shape. On the other hand, the cross-section of the other recess 12b has an almost half elliptic (divided along a longitudinal axis of the ellipsoid) shape. By the configuration that the inner surfaces of the recesses 12a and 12b facing the light emitting elements 15 and 16 are curved about the position of the light emitting elements, the distances from the light emitting surfaces of the light emitting elements 15 and 16 and the inner surfaces of the recesses 12a and 12b respectively are made almost constant for the whole area of the inner surfaces of the recesses 12a and 12b. With this feature, the lights emitted from the whole light emitting surfaces of the light emitting elements 15 and 16 respectively enter into the whole surfaces within the recesses 12a and 12b at a uniform illumination level.

As shown in FIGS. 4A through 4D, the inner surfaces of the recesses 12a and 12b formed on both of the left and right side end surfaces of the light guide plate 12 are inclined toward the center of the light guide plate 12 in the direction of the display board, i.e., the LCD 11. More specifically, the end surfaces are inclined toward the center of the light guide plate 12 with respect to a perpendicular in the direction of the display board 11. The function of these inclined surfaces will be described hereinafter.

Figure 5:
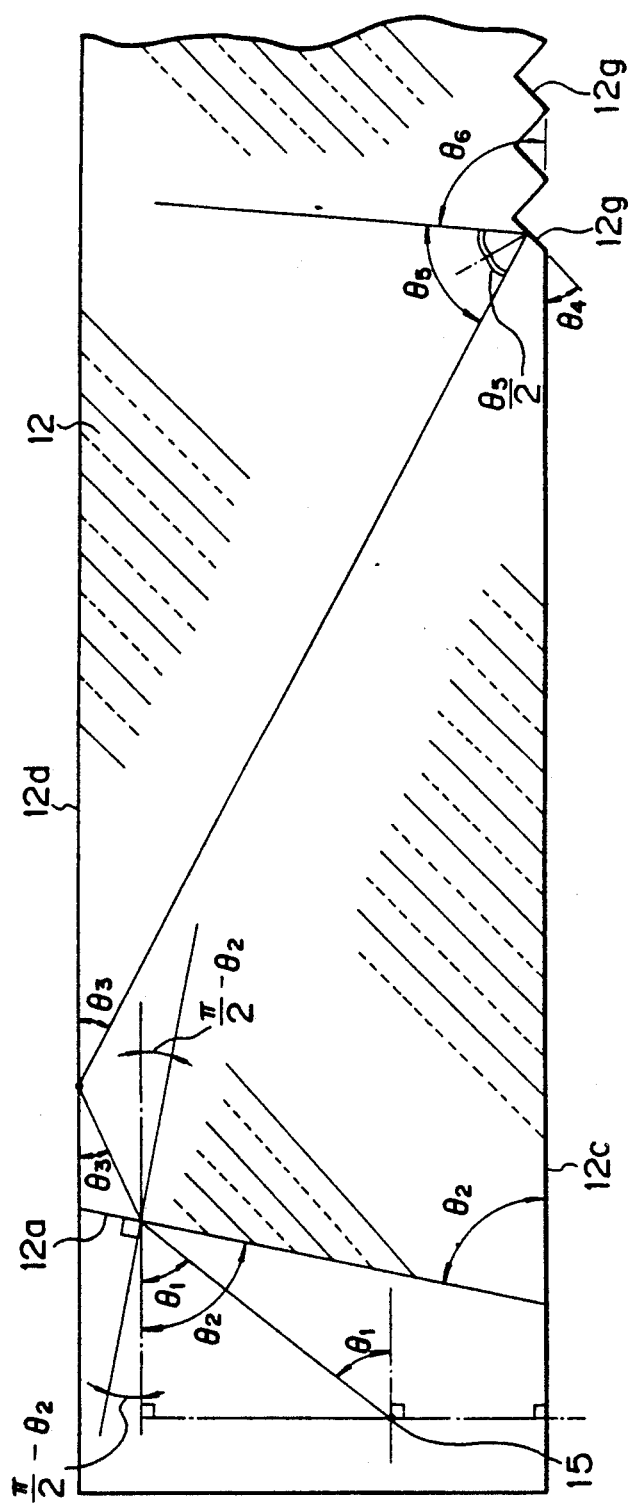
FIG. 5 is an enlarged view of a portion A in FIG. 3.

FIG. 5 is an enlarged cross sectional view of the recess 12a formed on the left side end of the light guide plate 12 and its peripheral portion. The refraction and internal reflection of the light issued from the light emitting element 15 will be explained with reference to FIG. 5.

In FIG. 5, $\theta_1$ represents the angle of an optical axis of the light from the light emitting element 15 with respect to the back surface 12c of the light guide plate 12, and $\theta_2$ represents the angle between the inner surface of the recess 12a and the back surface 12c. Similarly, $\theta_3$ represents the angle of an optical axis of a light beam incident into the light guide plate 12, which is refracted by the inner surface, with respect to a front surface 12d of the light guide plate 12. The back surface 12c and the front surface 12d of the light guide plate are parallel with each other.

In the case of the configuration described above, the refractive index n of the light guide plate 12 is expressed by the following equations:

$$\frac{\sin\left\{\theta_1 + \left(\frac{\pi}{2} - \theta_2\right)\right\}}{\sin\left\{\theta_3 + \left(\frac{\pi}{2} - \theta_2\right)\right\}} = n$$

$$\therefore \sin\left\{\theta_3 + \left(\frac{\pi}{2} - \theta_2\right)\right\} = \frac{1}{n}\sin\left\{\theta_1 + \left(\frac{\pi}{2} - \theta_2\right)\right\} \quad (1)$$

By expanding the right-hand side of the equation (1), we obtain the following equations:

$$\frac{1}{n}\sin\left\{\theta_1 + \left(\frac{\pi}{2} - \theta_2\right)\right\}$$

$$= \frac{1}{n}\left\{\sin\theta_1 \cdot \cos\left(\frac{\pi}{2} - \theta_2\right) + \cos\theta_1 \cdot \sin\left(\frac{\pi}{2} - \theta_2\right)\right\}$$

$$= \frac{1}{n}\left\{\sin\theta_1 \cdot \left(\cos\frac{\pi}{2} \cdot \cos\theta_2 + \sin\frac{\pi}{2} \cdot \sin\theta_2\right) + \cos\theta_1 \cdot \left(\sin\frac{\pi}{2} \cdot \cos\theta_2 - \cos\frac{\pi}{2} \cdot \sin\theta_2\right)\right\}$$

$$= \frac{1}{n}(\sin\theta_1 \cdot \sin\theta_2 + \cos\theta_1 \cdot \cos\theta_2)$$

$$= \frac{1}{n}\cos(\theta_2 - \theta_1)$$

Therefore, the equation (1) can be rewritten as follows:

$$\sin\left\{\theta_3 + \left(\frac{\pi}{2} - \theta_2\right)\right\} = \frac{1}{n}\cos(\theta_2 - \theta_1)$$

$$\therefore \theta_3 + \left(\frac{\pi}{2} - \theta_2\right) = \sin^{-1}\left\{\frac{1}{n}\cos(\theta_2 - \theta_1)\right\}$$

$$\therefore \theta_3 = \sin^{-1}\left\{\frac{1}{n}\cos(\theta_2 - \theta_1)\right\} - \left(\frac{\pi}{2} - \theta_2\right) \quad (1')$$

Figure 6:
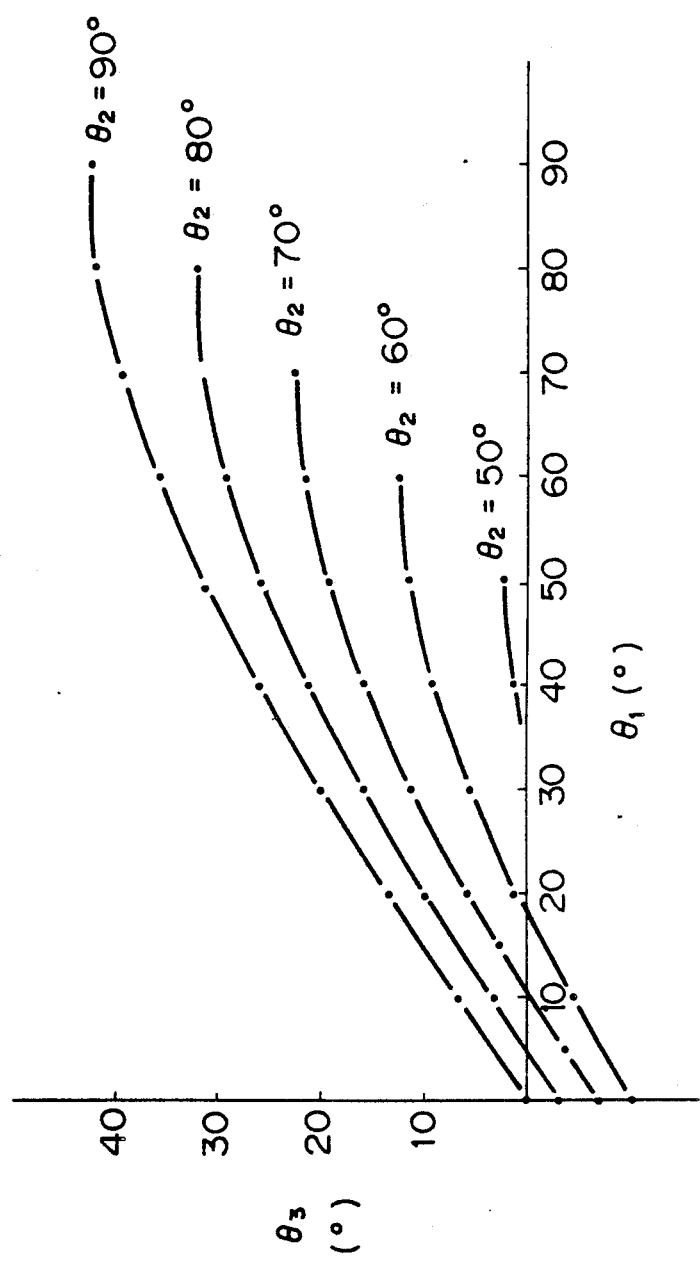
FIGS. 6 through 8 are graphs for explaining the function of the display board illuminating device shown in FIGS. 2 through 5.

If an acrylic resin is used as the material of the light guide plate 12, the value of n is equal to 1.5 (n=1.5), a graph shown in FIG. 6 can be drawn from the equation (1').

From the graph shown in FIG. 6 it can be seen that the smaller $\theta_2$, the smaller $\theta_3$ if $\theta_1$ is held constant. In other words, by making the value of $\theta_2$ small, the light is guided to further positions while the luminance level near the light emitting element 15 is suppressed. In this way, the efficiency in utilization of light is improved.

As another configuration for making $\theta_3$ small, it is conceivable to place the light emitting element 15 away from the inner surface of the recess 12a so that $\theta_1$ reduces. However, with such a method, the total length of the display board illuminating device including this distance of separation will be increased. This increase in the length is disadvantageous because the display unit made up of the display board illuminating device and the LCD 11 can not be housed in a confined space for mounting.

Therefore, in the case of the display board illuminating device according to the present invention, the efficiency in utilization of light is raised by making the value of $\theta_2$ so that the light is guided to further positions while increase in the overall length of the display board illuminating device is avoided.

In the foregoing, the function of the inclined surface has been described for the inner surface of the recess 12a provided in the left-hand side end of the light guide plate 12. However, as mentioned before, the inner surface of the recess 12b formed on the right-hand side end of the light guide plate 12 is inclined toward the center of the light guide plate 12 in the direction of the LCD 11 as in the case of the inner surface of the recess 12a. Therefore, the above-described function of the inclined inner surface of the recess 12a is also performed by the inner surface of the recess 12b, so that the light issued from the light emitting element 16 positioned in the recess 12b is reflected within the light guide plate 12, to reach to further positions.

As clearly shown in FIGS. 4A through 4D, the angle of inclination of the inner surfaces of the recesses 12a and 12b is not uniform for the whole surface of the inner surfaces. More specifically, at central portions 12e and 12f in the transverse direction of the light guide plate 12 and in the vicinities thereof (shown in FIG. 4A), the angle of inclination is made smallest. More specifically, this configuration is employed so that the light issued from each of the light emitting elements 15 and 16 is especially guided to further positions along a central line in the longitudinal direction of the light guide plate 12. By this feature the efficiency in the utilization of light is further improved.

As shown in FIGS. 2 through 5, a group of inclined reflecting surfaces is provided in the back surface, i.e., the surface on the opposite side of the surface facing the back surface of the LCD 11. The group of inclined reflecting surfaces is made of a plurality of linear notches 12g arranged in the longitudinal direction of the light guide plate 12, each of the notches 12g extending along a transverse direction of the light guide plate, and having a cross-section of an equilateral triangle. The reflection of light by the group of inclined reflecting surfaces will be described hereinafter.

In FIG. 5, $\theta_4$ represents an angle of the surface of each notch 12g forming the group of the inclined reflective surfaces relative to the back surface 12c of the light guide plate 12. $\theta_5$ represents a sum of the angle of incidence and the angle of emergence of the light reflected by an inclined reflecting surface forming each notch 12g. Similarly, $\theta_6$ represents an angle of the optical axis of the light reflected by the inclined reflecting surface with respect to the back surface 12c of the light guide plate 12. In this configuration, the relation among these angles and the angle $\theta_3$ is expressed by the following equations:

$$\theta_4 = \frac{\pi}{2} - \left(\theta_3 + \frac{\theta_5}{2}\right) \quad (2)$$

$$\theta_6 = \theta_4 + \left(\frac{\pi}{2} - \frac{\theta_5}{2}\right)\pi - (\theta_5 + \theta_3) \quad (3)$$

In order that the light reflected by the inclined reflecting surface of the notch 12g described above emerges effectively from the front surface 12d of the light guide plate 12, total reflection of the light should be attained. From the definition of the critical angle in the total reflection, the following equation is satisfied with respect to $\theta_5$ if the critical angle is assumed to be $\theta_5/2$.

$$\sin\left(\frac{\theta_5}{2}\right) = \frac{na}{n} \quad (4)$$

where n represents the refractive index of the light guide plate 12, and na represents the refractive index of air which is equal to 1.

Therefore, $\theta_5$ can be obtained from the equation (4) as follows:

$$\theta_5 = \sin^{-1}(1/n) \times 2$$

If the material of the light guide plate 12 is an acrylic resin as described before, the value of n is equal to 1.5 (n=1.5). Therefore:

$$\theta_5 = 83.62°$$

The magnitudes of $\theta_4$ and $\theta_6$ for setting $\theta_5$ at 83.62° can be respectively obtained from the equations (2) and (3) described before. Results of the calculation are summarized in the graph shown in FIG. 7. In this case, the numerical value of $\theta_3$ for substitution in the equations (2) and (3) is practically within a range of 0° through 40° as clearly shown in FIG. 6.

Figure 7:
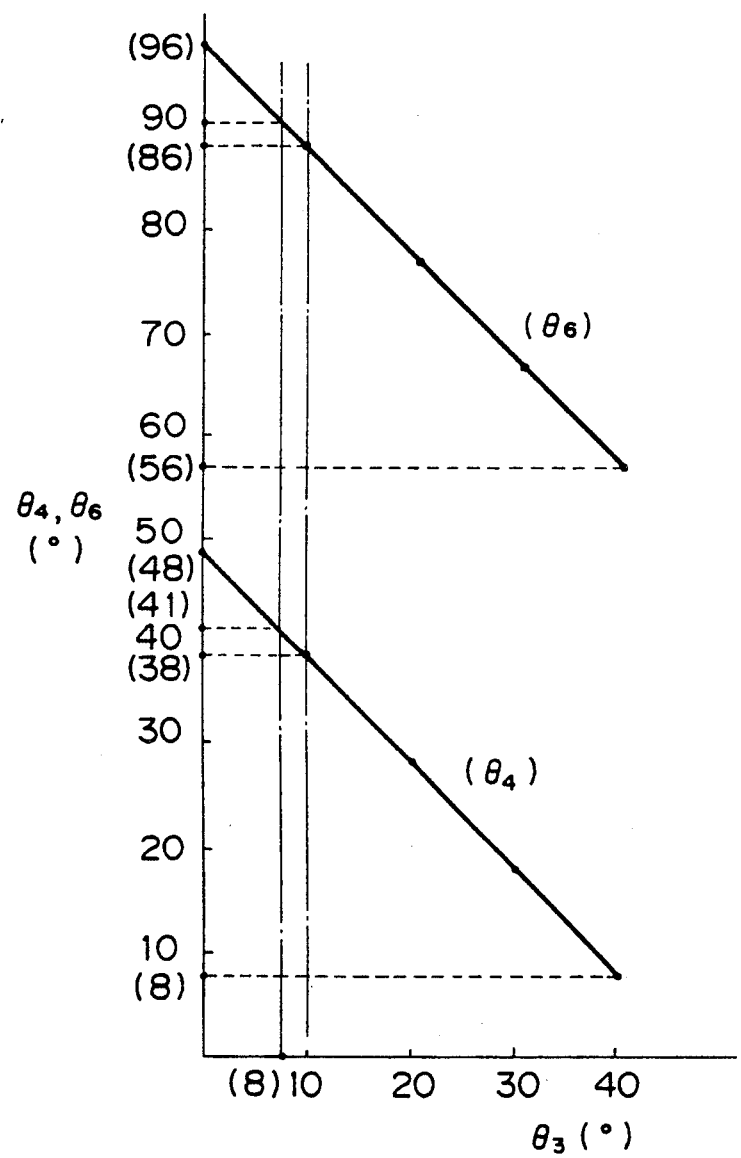

From the graph shown in FIG. 7, it will be appreciated that the value of $\theta_5$ equals 83.62° when $\theta_4$ is set at 48° from a range between 0° and 48° and correspondingly $\theta_6$ is set at 96° from a range between 56° and 96°.

The explanation will be further given for a case where $\theta_3$ is set at 10°.

From the graph shown in FIG. 7, $\theta_4 = 38°$, $\theta_6 = 86°$ under the condition of $\theta_3 = 10°$. In other words, by setting $\theta_3$ at 10°, the light is directed to the front surface 12d of the light guide plate 12 substantially at a right angle (86°), so that the utilization of light is optimized. In addition, if $\theta_3$ is set at about 8, $\theta_4$ and $\theta_6$ become 41° and 90° respectively ($\theta_4 = 41°$, $\theta_6 = 90°$), so that the light is directed to the front surface 12d of the light guide plate 12 substantially at a right angle.

The setting values of $\theta_1$ and $\theta_2$ for attaining the condition of $\theta = 10°$ will be explained hereinafter.

By expanding the left hand side of the equation (1), the following equations are obtained:

$$\sin\left(\theta_3 + \left(\frac{\pi}{2} - \theta_2\right)\right)$$

-continued $$= \sin\theta_3 \cdot \cos\left(\frac{\pi}{2} - \theta_2\right) + \cos\theta_3 \cdot \sin\left(\frac{\pi}{2} - \theta_2\right)$$

$$= \sin\theta_3 \cdot \left(\cos\frac{\pi}{2} \cdot \cos\theta_2 + \sin\frac{\pi}{2} \cdot \sin\theta_2\right) +$$

$$\cos\theta_3 \cdot \left(\sin\frac{\pi}{2} \cdot \cos\theta_2 - \cos\frac{\pi}{2} \cdot \cos\theta_2\right)$$

$$= \sin\theta_3 \cdot \sin\theta_2 + \cos\theta_3 \cdot \cos\theta_2$$

On the other hand, by expanding the right-hand side of the equation (1), the following equations are obtained.

$$\frac{1}{n}\sin\left(\theta_1 + \left(\frac{\pi}{2} - \theta_2\right)\right)$$

$$= \frac{1}{n}\left\{\sin\theta_1 \cdot \cos\left(\frac{\pi}{2} - \theta_2\right) + \cos\theta_1 \cdot \sin\left(\frac{\pi}{2} - \theta_2\right)\right\}$$

$$= \frac{1}{n}\left\{\sin\theta_1 \cdot \left(\cos\frac{\pi}{2} \cdot \cos\theta_2 + \sin\frac{\pi}{2} \cdot \sin\theta_2\right) + \cos\theta_1 \cdot \left(\sin\frac{\pi}{2} \cdot \cos\theta_2 - \cos\frac{\pi}{2} \cdot \sin\theta_2\right)\right\}$$

$$= \frac{1}{n}(\sin\theta_1 \cdot \sin\theta_2 + \cos\theta_1 \cdot \sin\theta_2)$$

Therefore, the equation (1) can be rewritten as follows:

$$\sin\theta_3 \cdot \sin\theta_2 + \cos\theta_3 \cdot \cos\theta_2$$

$$= \frac{1}{n}(\sin\theta_1 \cdot \sin\theta_2 + \cos\theta_1 \cdot \cos\theta_2)$$

$$\therefore \sin\theta_2 \cdot \left(\sin\theta_3 - \frac{1}{n}\sin\theta_1\right) =$$

$$\cos\theta_2 \cdot \left(\frac{1}{n}\cos\theta_1 - \cos\theta_3\right)$$

$$\therefore \tan\theta_2 = \frac{\cos\theta_1 - n \cdot \cos\theta_3}{n \cdot \sin\theta_3 - \sin\theta_1}$$

Therefore:

$$\theta_2 = \tan^{-1}\left(\frac{\cos\theta_1 - n \cdot \cos\theta_3}{n \cdot \sin\theta_3 - \sin\theta_1}\right) \quad (5)$$

Figure 8:
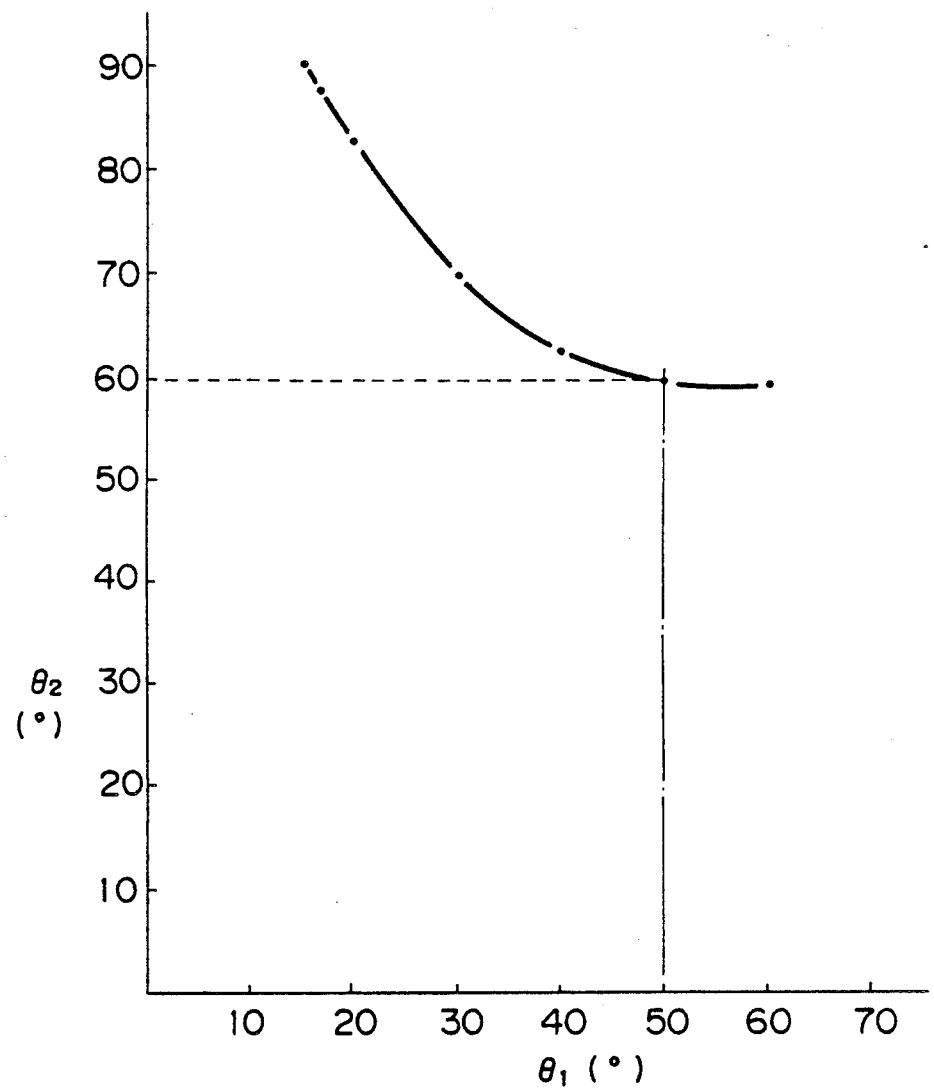

By substituting the condition of $\theta_3 = 10°$ for the equation (5), a graph can be drawn as shown in FIG. 8.

From the graph of FIG. 7, it will be appreciated that $\theta_2$ should be set at 60° for setting $\theta_3$ at 10°, if $\theta_1$ is equal to 50°.

Figure 9:
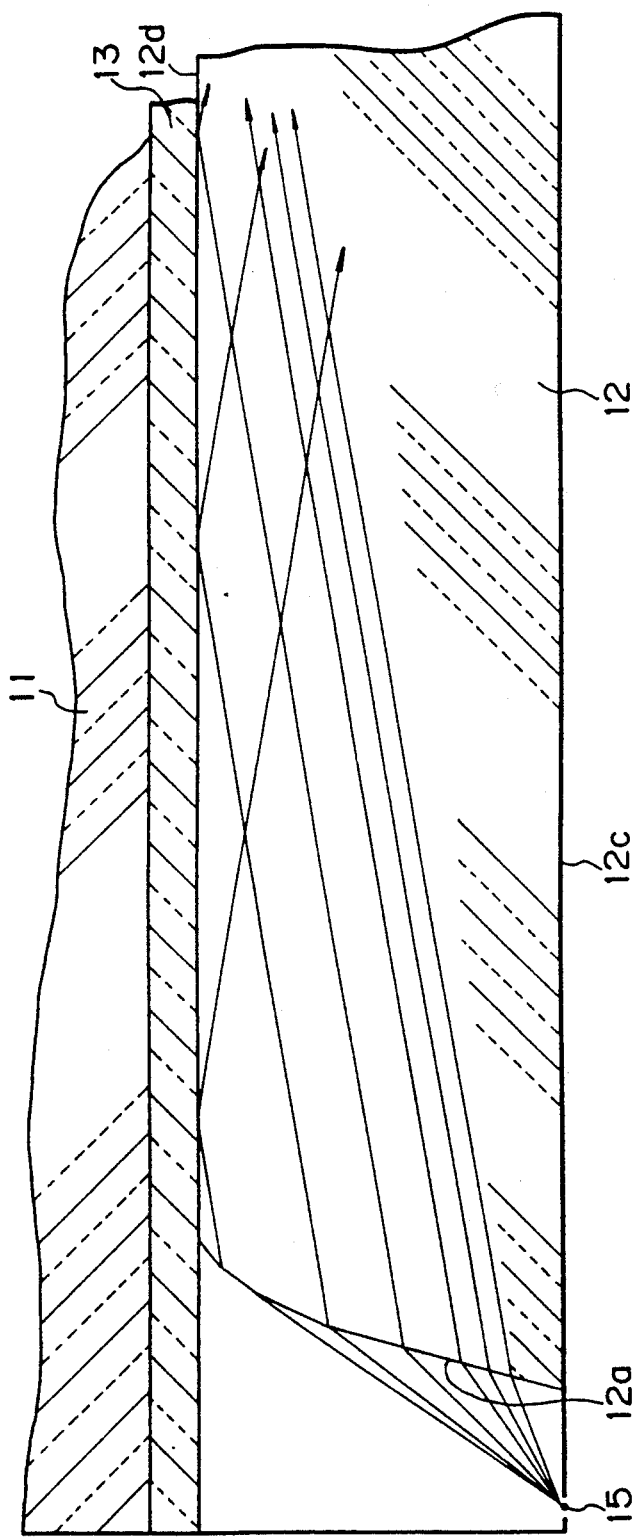
FIG. 9 is a longitudinal sectional view of a major part of a display board illuminating device as a second embodiment of the invention.

FIG. 9 is a cross sectional view of the recess 12a and its peripherals formed on the left side end of the light guide plate 12 which is a major part in the second embodiment of the display board illuminating device according to the present invention. This display board illuminating device has the same structure as the device shown in FIGS. 2 through 5 except the portions described below, and the description of the structure will not be repeated. In the following description, like reference numerals are used for designating portions the same as or corresponding to the portions of the device shown in FIGS. 2 through 5, and the same applies to the description of further embodiments.

As shown in FIG. 9, the inner surface of the recess 12a formed on the left side end of the light guide plate 12 is inclined toward the center of the light guide plate 12 in the direction of the LCD 11. Furthermore, the angle of inclination (the angle between the inner surface and the back surface of the light guide plate) is gradually reduced in the direction of the LCD 11. In the case of this configuration, of course the function of the display board illuminating device shown in FIGS. 2 through 5 is obtained. Furthermore, by suitably determining the rate of change in the inclination of the inner surface of the recess 12a, it is possible to convert almost all of the light beams emitted from the light emitting element 15 and incident on different portions of the inner surface of the recess at different angles of incidence into parallel lights within the light guide plate 12. By this feature, irregular reflection of light is prevented so that the light can be utilized further efficiently.

Figure 10:
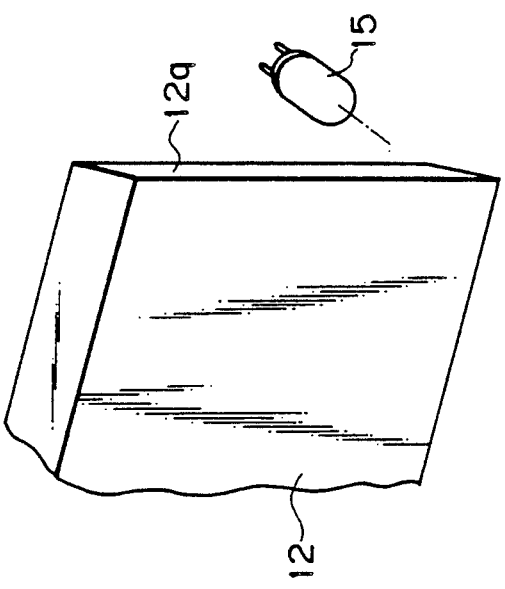
FIGS. 10 and 11 are perspective and longitudinal sectional views respectively, of a main part of a display board illuminating device as a third embodiment of the invention.
Figure 11:
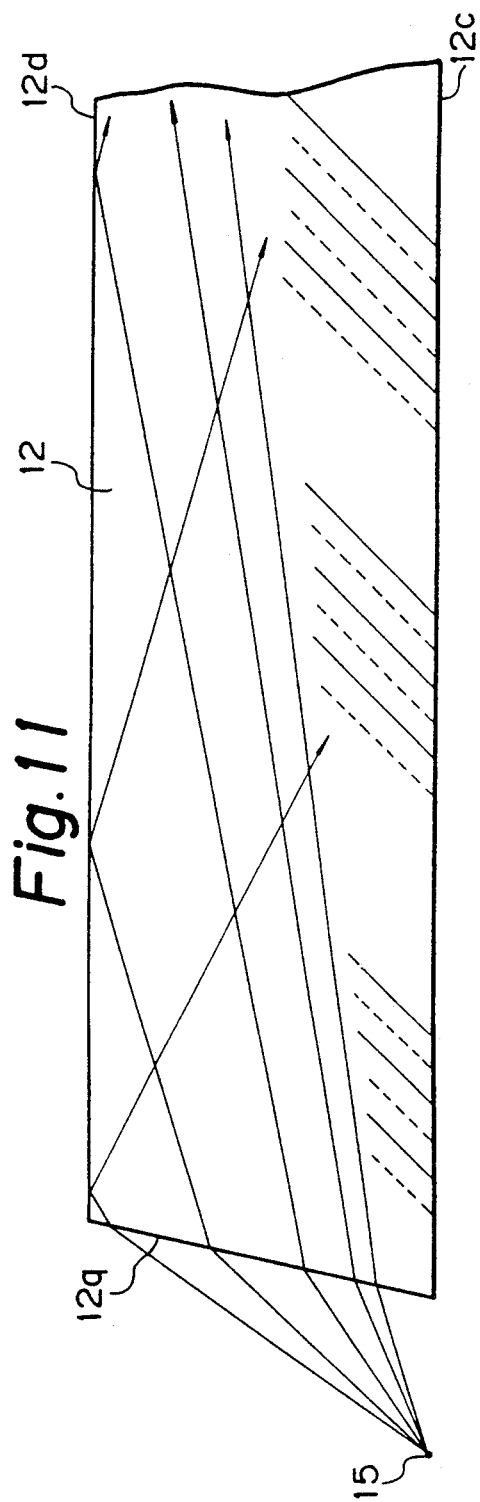

FIGS. 10 and 11 illustrate the left side end portion of a light guide plate 12 shown as a major part of the third embodiment of the display board illuminating device according to the present invention.

In the case of the display board illuminating device shown in FIGS. 10 and 11, the whole surface of the side end of the light guide plate 12q is made flat, and the surface is inclined toward the center of the light guide plate 12 in the direction of the back surface of the LCD 11. With this configuration, the light beams emitted by the light emitting element 15 and incident on different portions of the side end surfaces 12q may not easily be converted to parallel lights in the light guide plate 12. However, the effect obtained by the display board illuminating device shown in FIGS. 2 through 5 can sufficiently be obtained. Since the side end surface 12q of the light guide plate 12 is made flat, the production process thereof is extremely simple, so that the production cost can be easily reduced.

In the foregoing, the display board illuminating apparatus having various configurations for guiding the light emitted from the light emitting element to further locations have been described. Of course, the advantageous features of the described devices may be combined to provide a display board illuminating device having all advantageous features of the described example. In such a case, the light is guided to further locations at an extremely high efficiency, and an optimum utilization of light can be attained.

As specifically described in the foregoing, in the display board illuminating apparatus according to the present invention, a side end surface of the light guide plate arranged to face the back surface of the display board to be illuminated, the side end surface crossing the longitudinal direction of the light guide plate, is inclined toward the center of the light guide plate in the direction of the display board. By this configuration it is possible to reduce the angle of light, which is generated by a light source arranged to face the end surface and incident into the light guide plate after being refracted on the end surface, with respect to a main surface of the light guide plate. Furthermore, owing to such a configuration, less power of the light source is required as compared with conventions illuminating devices, so that thermal influence on the display board or other units as well as the power consumption is reduced.

What is claimed is:

1. A display board illuminating device for illuminating a display board, comprising:
    a light guide plate placed to face the back of said display board to be illuminated, said plate having at least two side ends and a back surface; and
    a light source disposed to face at least one of said side ends of said light guide plate and crossing a longitudinal axis of said light guide plate, wherein an angle between a portion of said side end at said light source and the back surface of said guide plate is less than 90° so that said portion of said side end is inclined toward the center of said light guide plate with respect to a normal of said light guide plate directed to said display board.

2. A device as claimed in claim 1 wherein said light source is a single light emitting element disposed to face one of said side ends of said light guide plate.

3. A device as claimed in claim 1 wherein said light source comprises at least two light emitting elements, each one of said elements being disposed to face at least one of said side ends of said light guide plate, and colors of lights emitted by at least two of said light emitting elements are different from each other.

4. A device as claimed in one of claims 1 through 3, wherein a recess extending between front and back surfaces of said light guide plate is provided in each of said side ends, and an inner surface of said recess is inclined toward the center of said light guide plate in the direction of said display board.

5. A device as claimed in claim 4, wherein said inner surface of said recess is formed into a curved surface crossing a plane parallel to the back surface of said light guide plate.

6. A device as claimed in claim 4, wherein an angle of said inner surface of said recess with respect to the back surface of said light guide plate is made minimum at about a center position in the lateral direction of said light guide plate.

7. A device as claimed in claim 5, wherein an angle of said inner surface of said recess with respect to the back surface of said light guide plate is made minimum at about a center position in the lateral direction of said light guide plate.

8. A device as claimed in one of claims 1 through 3, wherein an angle of a surface at each of said side ends with respect to the back surface of said light guide plate is gradually reduced in the direction of said display board.

9. A device as claimed in one of claims 1 through 3, wherein a whole surface of each of said side ends is formed as an inclined flat surface.

10. A device as claimed in one of claims 1 through 3, wherein a group of inclined reflecting surfaces is formed in said light guide plate on an opposite side of said surface facing said back surface of said display board.

* * * * *